(12) United States Patent
Zettel et al.

(10) Patent No.: US 7,570,022 B2
(45) Date of Patent: Aug. 4, 2009

(54) VARIABLE BATTERY REFRESH CHARGING CYCLES

(75) Inventors: Andrew M. Zettel, Ann Arbor, MI (US); Damon R. Frisch, Troy, MI (US); Mary A. Jeffers, Clarkston, MI (US); Goro Tamai, West Bloomfield, MI (US); Brian J. Koch, Berkley, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 520 days.

(21) Appl. No.: 11/054,241

(22) Filed: Feb. 9, 2005

(65) Prior Publication Data

US 2006/0176024 A1     Aug. 10, 2006

(51) Int. Cl.
*H02J 7/04* (2006.01)
(52) U.S. Cl. .................. 320/132; 320/104; 320/134; 320/163; 324/427; 324/432
(58) Field of Classification Search .............. 320/104, 320/131, 132, 133, 134, 149, 155, 163, DIG. 21; 324/427, 428, 432
See application file for complete search history.

(56) References Cited

U.S. PATENT DOCUMENTS

| | | | |
|---|---|---|---|
| 3,781,631 A * | 12/1973 | Nelson et al. ............... | 320/139 |
| 4,456,869 A * | 6/1984 | Schub ......................... | 320/155 |
| 5,497,067 A * | 3/1996 | Shaw .......................... | 320/155 |
| 5,656,919 A * | 8/1997 | Proctor et al. ................ | 320/153 |
| 5,694,023 A * | 12/1997 | Podrazhansky et al. ...... | 320/129 |
| 5,767,659 A * | 6/1998 | Farley ......................... | 320/106 |
| 6,483,272 B1 | 11/2002 | Terada et al. ................. | 320/103 |
| 6,545,449 B2 | 4/2003 | Ueda et al. ................... | 320/132 |
| 6,617,829 B1 * | 9/2003 | Smith ......................... | 320/134 |
| 6,646,419 B1 | 11/2003 | Ying .......................... | 320/132 |
| 6,686,724 B2 | 2/2004 | Coates et al. ................ | 320/135 |
| 6,700,383 B2 | 3/2004 | Kimura et al. ............... | 324/429 |
| 2002/0167296 A1 * | 11/2002 | Nagata et al. ................ | 320/155 |
| 2003/0197484 A1 * | 10/2003 | Kotlow et al. ................ | 320/104 |
| 2003/0231005 A1 * | 12/2003 | Kohama et al. .............. | 320/132 |
| 2004/0251870 A1 * | 12/2004 | Ueda et al. ................... | 320/104 |

FOREIGN PATENT DOCUMENTS

JP     2004-328906 A     11/2004

* cited by examiner

*Primary Examiner*—Akm E Ullah
*Assistant Examiner*—Arun Willliams

(57) ABSTRACT

A refresh control system that selectively initiates a refresh charge cycle includes an energy storage device and an electric machine that is operable to charge the energy storage device. A control module monitors a usage period of the energy storage device and determines a bias factor. The control module determines a modified usage period threshold based on a usage period threshold and the bias factor. The control module regulates the electric machine to initiate a refresh charge cycle of the energy storage device when the usage period exceeds the modified usage period threshold.

54 Claims, 6 Drawing Sheets

VARIABLE BATTERY REFRESH CHARGING CYCLES

FIELD OF THE INVENTION

The present invention relates to energy storage devices, and more particularly to on-board battery refresh charging.

BACKGROUND OF THE INVENTION

Energy storage devices (ESDs), such as batteries, are commonly implemented in vehicles to provide electrical power to power various electrical loads. The ESD is discharged as it powers a load. In certain ESDs, lead-acid batteries in particular, sulphates form on the internal components of the ESD. The sulphates decrease the surface area available to the electrolyte and increase internal resistance. More sulphates appear on the internal components with each subsequent discharge cycle.

To reduce the presence of sulphates in the ESD, the sulphation process is reversed during a refresh recharge. For example, lead sulphate ($PbSO_4$) on the ESD components can be removed through sustained charging of the ESD at a higher than normal voltage. In most battery chemistries, the refresh recharge doubles as an equalization charge that corrects for voltage and individual energy variations of the modules in a string of batteries. In a hybrid vehicle that employs an engine ON/OFF strategy, refresh recharge can be difficult to implement. More specifically, the refresh recharge may require the engine to run for an extended period. Regenerative braking may also need to be disabled.

SUMMARY OF THE INVENTION

Accordingly, the present invention provides a refresh control system to selectively initiate a refresh charge cycle. The refresh control system includes an energy storage device and an electric machine that is operable to charge the energy storage device. A control module monitors a usage period of the energy storage device and determines a bias factor. The control module determines a modified usage period threshold based on a usage period threshold and the bias factor. The control module regulates the electric machine to initiate a refresh charge cycle of the energy storage device when the usage period exceeds the modified usage period threshold.

In other features, the bias factor includes a temperature bias factor. The refresh control system further includes a temperature sensor that monitors a temperature of the energy storage device. The temperature bias factor is determined based on the temperature. Alternatively, the temperature bias factor is determined from a look-up table based on the temperature. The temperature can be an average temperature that is determined over the usage period.

In other features, the bias factor includes a depth of discharge (DOD) bias factor. The refresh control system further includes a current sensor that monitors a current of the energy storage device. The DOD bias factor is determined based on the current. The refresh control system further includes a voltage sensor that monitors a voltage of the energy storage device. The DOD bias factor is determined based on the voltage.

In another feature, the control module monitors a rest time of the energy storage device and regulates the electric machine to initiate a refresh charge cycle of the energy storage device when the rest time exceeds a threshold rest time.

In another feature, the control module regulates the electric machine to initiate a refresh charge cycle of said energy storage device when the usage period exceeds the modified usage period threshold, a state of charge (SOC) of the energy storage device is above an SOC threshold and a current of the energy storage device is below a current threshold.

In still another feature, the refresh control system further includes an engine that selectively drives the electric machine. The control module regulates the electric machine to initiate a refresh charge cycle of the energy storage device when the usage period exceeds the modified usage period threshold and the engine is on.

In yet another feature, the usage period includes an amp-hour count and the modified usage period threshold includes a modified amp-hour threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
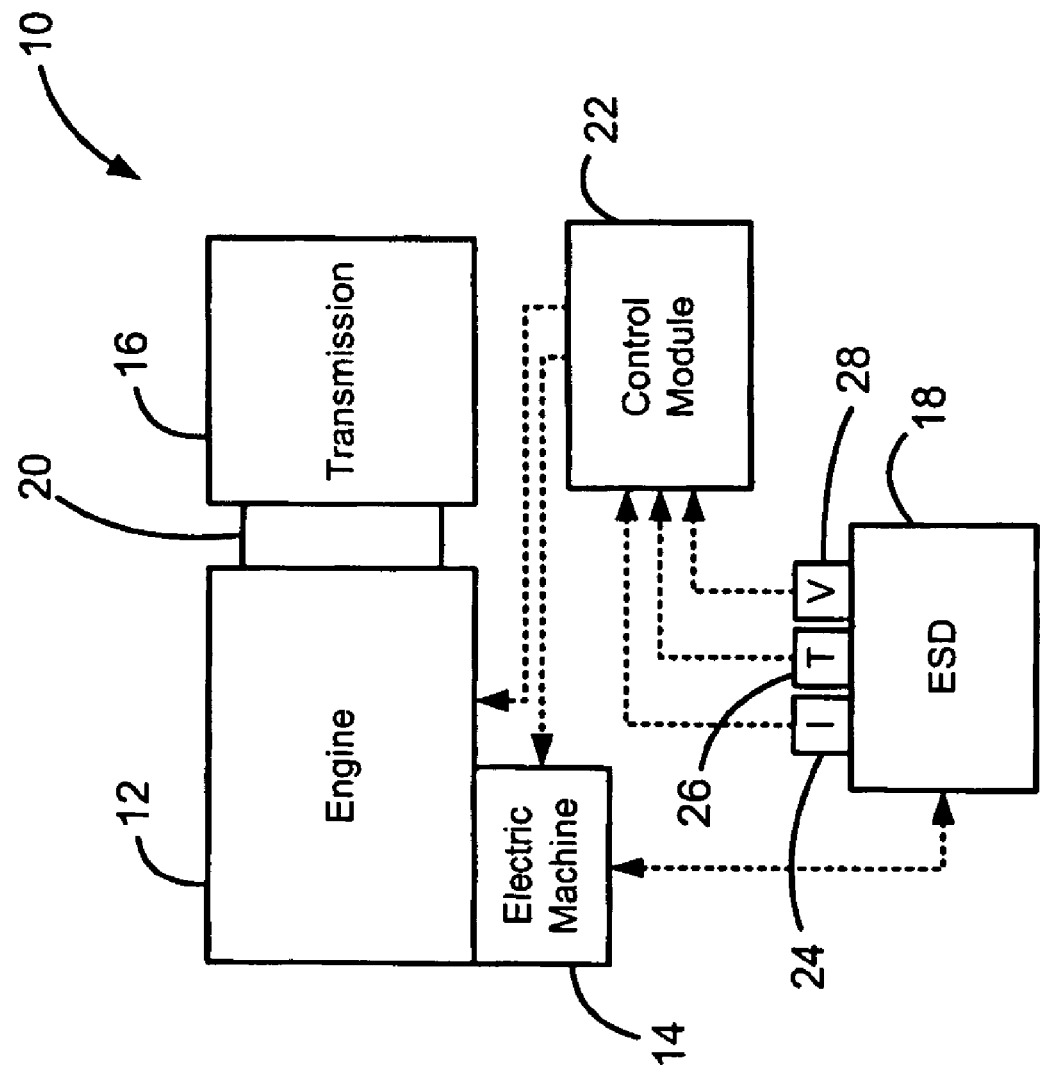
FIG. 1 is a schematic illustration of a hybrid vehicle implementing the battery refresh control system of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary hybrid vehicle 10 is schematically illustrated. The hybrid vehicle 10 includes an engine 12 and an electric machine 14, which selectively drive a transmission 16. More specifically, the electric machine 14 supplements the engine 12 to produce drive torque to drive the transmission 16. In this manner, fuel efficiency is increased and emissions are reduced. In one mode, the engine 12 drives the electric machine 14 to generate power used to recharge an energy storage device (ESD) 18, such as a battery. In another mode, the electric machine 14 drives the transmission 16 using energy from the ESD 18.

The engine 12 and the electric machine 14 can be coupled via a belt-alternator-starter (BAS) system (not shown) that includes a belt and pulleys. Alternatively, the engine 12 and the electric machine 14 can be coupled via a flywheel-alternator-starter (FAS) system (not shown), wherein the electric machine 14 is operably disposed between the engine 12 and the transmission 16. It is anticipated that other systems can be implemented to couple the engine 12 and the electric machine 14 including, but not limited to, a chain or gear system that is implemented between the electric machine 14 and a crankshaft.

The transmission 16 can include, but is not limited to, a continuously variable transmission (CVT), a manual transmission, an automatic transmission and an automated manual transmission (AMT). Drive torque is transferred from the engine 12 to the transmission 16 through a coupling device 20. The coupling device 20 can include, but is not limited to, a friction clutch or a torque converter depending upon the type of transmission implemented. In the case of a CVT, the coupling device 20 includes a torque converter and a torque converter clutch (TCC). The transmission 16 multiplies the drive torque through one of a plurality of gear ratios to drive a vehicle driveline (not shown).

A control module 22 regulates operation of the vehicle 10 based on the refresh recharge control system of the present invention. A current sensor 24 generates a current signal that is sent to the control module 22 and a temperature sensor 26 generates a temperature signal that is sent to the control module 22. A voltage sensor 28 generates a battery voltage signal that is sent to the control module 22. Although single current, temperature and voltage sensors are disclosed herein, it is appreciated that multiple current, multiple temperature and multiple voltage sensors can be implemented. The control module 22 determines a state of charge (SOC) of the ESD 18 based on the current and voltage signals. There are several methods that can be implemented to determine the SOC. An exemplary method is disclosed in commonly assigned U.S. Pat. No. 6,646,419, issued on Nov. 11, 2003 and entitled State of Charge Algorithm for Lead-Acid Battery in a Hybrid Electric Vehicle, the disclosure of which is expressly incorporated herein by reference.

Figure 2:
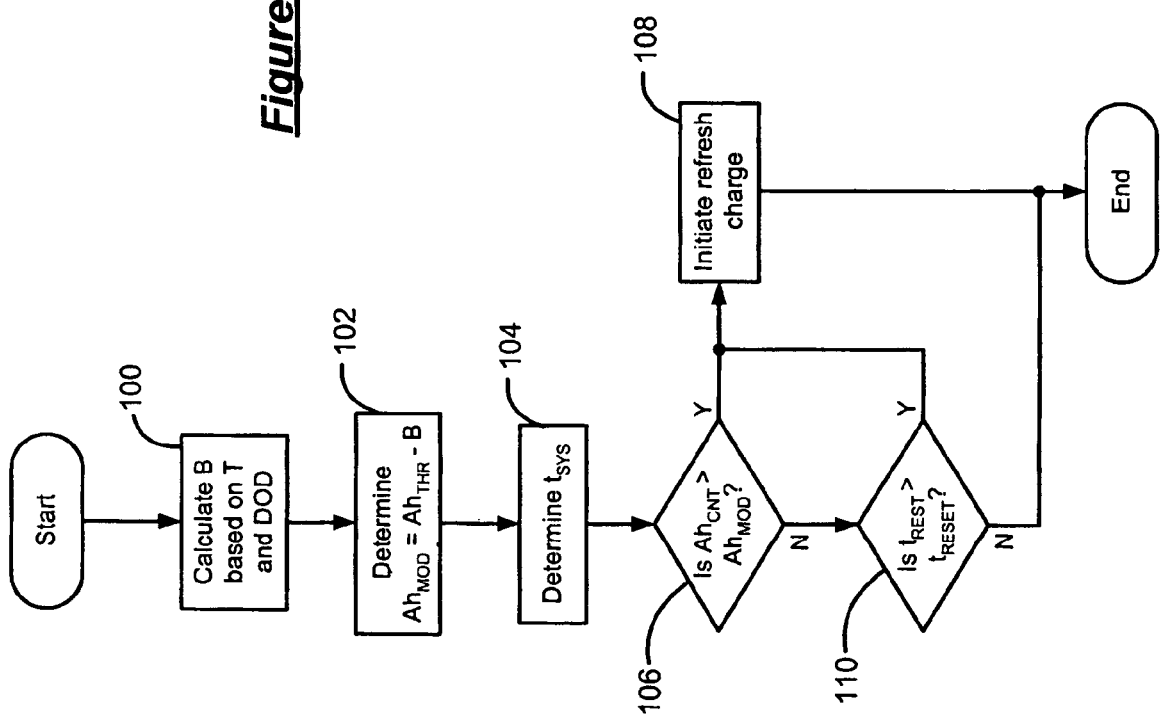
FIG. 2 is a flowchart illustrating steps executed by the refresh control system to initiate a battery refresh charge.

Referring now to FIG. 2, a refresh recharge of the ESD 18 is initiated based on a temperature bias factor ($B_{TEMP}$), a depth of discharge (DOD) bias factor ($B_{DOD}$) and a rest time ($t_{REST}$). $t_{REST}$ is the length of time that the ESD 18 sits idle (e.g., the vehicle 10 is parked for an extended period of time). In general, DOD is provided as a percentage that relates to the quantity of charge removed with relative to the capacity of the ESD 18. In step 100, control calculates a bias factor (B) based on $B_{TEMP}$ and $B_{DOD}$. In some implementations, B is equal to the sum of $B_{TEMP}$ and $B_{DOD}$, although it is anticipated that other functions can be used including, but not limited to, a weighted sum, a non-linear equation or other modifiers. In step 102, control determines a modified amp-hour threshold ($Ah_{MOD}$) based on a standard amp-hour threshold ($Ah_{THR}$) and B. In some implementations, $Ah_{MOD}$ is equal to the difference between $Ah_{THR}$ and B. Control determines $t_{REST}$ in step 104.

In step 106, control determines whether a current amp-hour count ($Ah_{CNT}$) is greater than $Ah_{MOD}$. If $Ah_{CNT}$ is greater than $Ah_{MOD}$, control continues in step 108. If $Ah_{CNT}$ is not greater than $Ah_{MOD}$, control continues in step 110. In step 108, control initiates the refresh recharge and control ends. In step 110, control determines whether $t_{REST}$ is greater than a reset time ($t_{RESET}$). If $t_{REST}$ is greater than $t_{RESET}$, control continues in step 108. If $t_{REST}$ is not greater than $t_{RESET}$, control ends.

Figure 3:
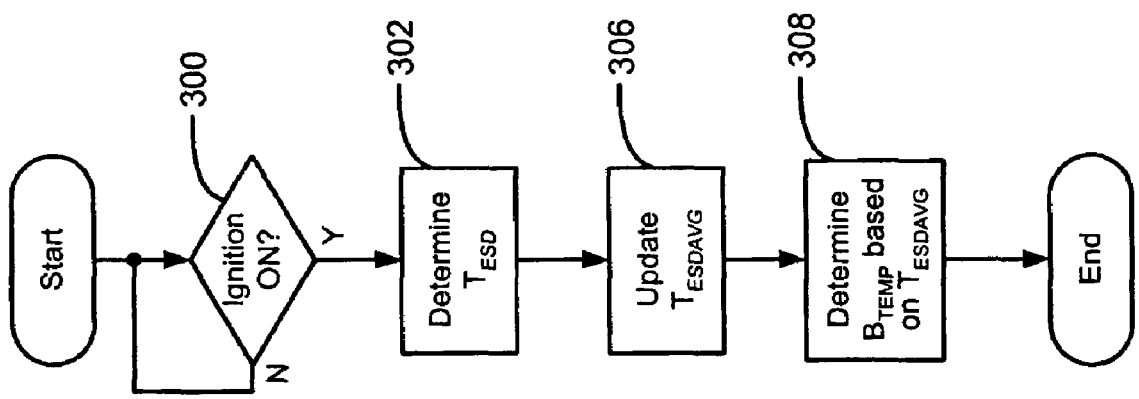
FIG. 3 is a flowchart illustrating steps executed by the battery refresh control system to determine a temperature bias factor.

Referring now to FIG. 3, $B_{TEMP}$ is determined based on a temperature of the ESD 18 ($T_{ESD}$). More specifically, $B_{TEMP}$ is determined based on a running average temperature of the ESD 18 ($T_{ESDAVG}$). $T_{ESDAVG}$ is used as an indication of the resting environment in which the ESD 18 is stored. Because the ESD 18 is left at a partial state of charge, $B_{TEMP}$ is increased at warmer temperatures such that the refresh charge frequency is increased. In colder environments, $B_{TEMP}$ is decreased such that the refresh recharge is executed less frequently. It is anticipated that a filter can be used to weight the temperature data such that more recent temperature has a greater influence on $B_{TEMP}$.

In step 300, control determines whether the ignition is ON. If the ignition is ON, control continues in step 302. If the ignition is not ON, control loops back. In step 302, control determines $T_{ESD}$. Although the temperature sensor generates a signal that can be used to determine $T_{ESD}$, it is anticipated that other methods of determining $T_{ESD}$ can be implemented including, but not limited to, estimating $T_{ESD}$ based on environmental conditions (e.g., engine temperature). In step 304, control updates $T_{ESDAVG}$. Control determines $B_{TEMP}$ based on $T_{ESDAVG}$ in step 306 and control ends. More specifically, $B_{TEMP}$ is determined from a look-up table based on $T_{ESDAVG}$.

Figure 4:
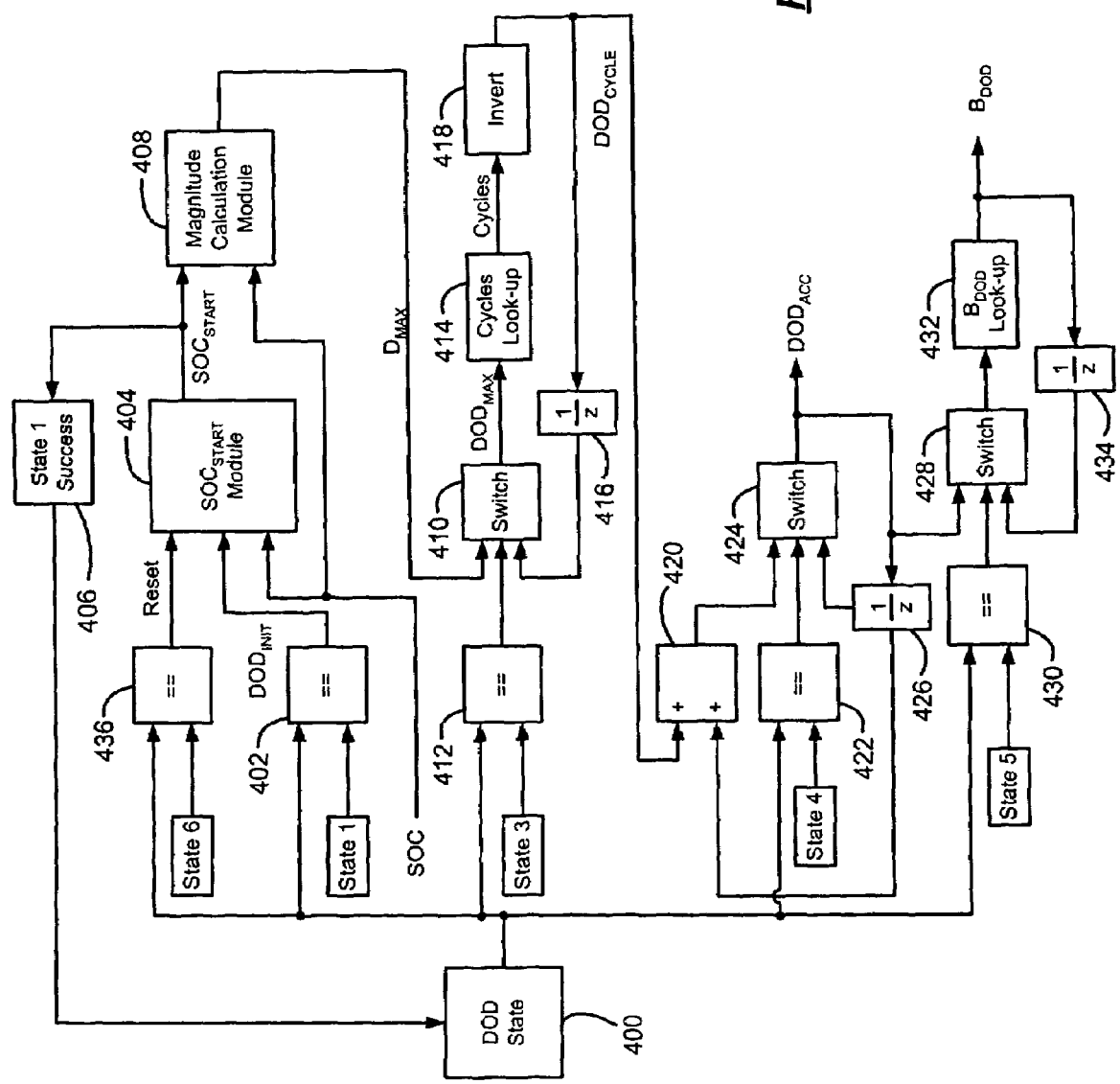
FIG. 4 is a signal flow diagram illustrating calculation a depth of discharge (DOD) bias factor.

Referring now to FIG. 4, $B_{DOD}$ is determined based an accumulated depth of discharge ($DOD_{ACC}$). $B_{DOD}$ is used to estimate the state of health (SOH) of the ESD 18. An initial SOC of the ESD 18 ($SOC_{START}$) is input and the maximum magnitude DOD is measured within a sample interval. The number of discharges (i.e., life) a particular ESD 18 can sustain is known and can be plotted as a curve. The curve is used to take the percent depth of discharge (% DOD) and determine the expected amount of life taken away due to the particular discharge. This effect is typically exponential in nature. Therefore, the deeper the discharge, the more profound the change in life. For example, an exemplary ESD that undergoes a full 100% discharge cycle can most likely only sustain 400 cycles. If the exemplary ESD undergoes only a 5% discharge cycle, the ESD can sustain 8000 cycles. In determining $B_{DOD}$, the 100% discharge case is used as a limit (i.e., 400 cycles). Each discharge cycle is monitored and the larger the discharge becomes, the more frequent the refresh charge occurs. If an aggressive charge and discharge profile is placed on the ESD 18, the refresh recharge occurs more frequently.

A DOD state module 400 determines the DOD state. At start-up, the DOD state is set equal to 1. A comparator 402 receives the output of the DOD state module 400 and a constant (State 1). If the output of the DOD state module 400 and the constant are equal, the comparator 402 passes a signal to a starting SOC ($SOC_{START}$) module 404, which calculates $SOC_{START}$. The $SOC_{START}$ module 404 also receives SOC as an input. SOC is determined based on an initial DOD ($DOD_{INIT}$) (e.g., 99), as discussed above. $SOC_{START}$ is output to a State 1 success module 406 and a magnitude calculation module 408. The State 1 success module relays a signal to the DOD state module 400 indicating that $SOC_{START}$ has been calculated. The DOD state moves to State 2, upon successful calculation of $SOC_{START}$.

The magnitude calculation module 408 continuously monitors SOC for a deviation from $SOC_{START}$ over a period of time. More specifically, the magnitude calculation module 408 outputs a maximum deviation ($D_{MAX}$) in SOC. $D_{MAX}$ is determined as a change in SOC from $SOC_{START}$ that is maintained for a threshold period of time. DMAX is forwarded to a switch 410. When such a deviation occurs, the DOD state module 400 sets the DOD state equal to 3. A comparator 412 receives the output of the DOD state module 400 and a constant (State 3). If the output of the DOD state module 400 and the constant are equal (i.e., the DOD state is equal to 3), the comparator 412 passes a signal to the switch 410. The signal induces the switch 410 to pass $D_{MAX}$ as a maximum DOD ($DOD_{MAX}$) to a cycle look-up module 414. If a signal is not sent from the comparator 412 to the switch 410 (i.e., the DOD state is not equal to 3), the switch forwards a previous DOD cycle factor ($DOD_{CYCLE}$) from a buffer 416. The cycle look-up module 414 determines the expected number of cycles or life that is taken away as a result of the associated DOD. An inverter 418 inverts the cycles to provide $DOD_{CYCLE}$, which is the incremental reduction in life as a result of the DOD. $DOD_{CYCLE}$ is forwarded to the buffer 416 and a summer 420, discussed in further detail below.

Upon determining $DOD_{CYCLE}$, the DOD state module 400 sets the DOD state equal to 4. A comparator 422 receives the output of the DOD state module 400 and a constant (State 4). If the output of the DOD state module 400 and the constant are equal (i.e., the DOD state is equal to 4), the comparator 422 passes a signal to a switch 424. The signal induces the switch 424 to pass an accumulated DOD ($DOD_{ACC}$) from the summer 420. If a signal is not sent from the comparator 422 to the switch 424 (i.e., the DOD state is not equal to 4), the switch forwards a previous $DOD_{ACC}$ from a buffer 426. The summer 420 updates $DOD_{ACC}$ by adding $DOD_{CYCLE}$ to the previous $DOD_{ACC}$ from the buffer 426. $DOD_{ACC}$ is stored in memory and is input to a switch 428, discussed in further detail below.

Upon updating $DOD_{ACC}$, the DOD state module 400 sets the DOD state equal to 5. A comparator 430 receives the output of the DOD state module 400 and a constant (State 5). If the output of the DOD state module 400 and the constant are equal (i.e., the DOD state is equal to 5), the comparator 430 passes a signal to the switch 428. The signal induces the switch 428 to pass the updated $DOD_{ACC}$ to a $B_{DOD}$ look-up module 432. If a signal is not sent from the comparator 430 to the switch 428 (i.e., the DOD state is not equal to 5), the switch forwards a previous $B_{DOD}$ from a buffer 434. The $B_{DOD}$ look-up module 432 determines $B_{DOD}$ from a look-up table based on the updated $DOD_{ACC}$. Control determines AhMOD based on $B_{DOD}$ as discussed in detail herein.

Upon determining $B_{DOD}$, the DOD state module 400 sets the DOD state equal to 6. A comparator 436 receives the output of the DOD state module 400 and a constant (State 6). If the output of the DOD state module 400 and the constant are equal (i.e., the DOD state is equal to 6), the comparator 436 passes a reset signal to the $SOC_{START}$ module. In this manner, control restarts monitoring the SOC for a deviation and the DOD state is again set equal to 1. In general, the DOD state is equal to 1 upon initialization or reset. The DOD state is set equal to 2 upon calculation of $SOC_{START}$. The DOD state is set equal to 3 when a deviation occurs in the SOC and remains for a threshold period of time. The DOD state is set equal to 4 upon determining $DOD_{CYCLE}$ based on $D_{MAX}$. The DOD state is set equal to 5 once $DOD_{ACC}$ has been updated based on $DOD_{CYCLE}$. The DOD state is set equal to 6 after $B_{DOD}$ is determined based on the updated $DOD_{ACC}$. Finally, the DOD state is set back equal to 1 upon a reset.

Figure 5:
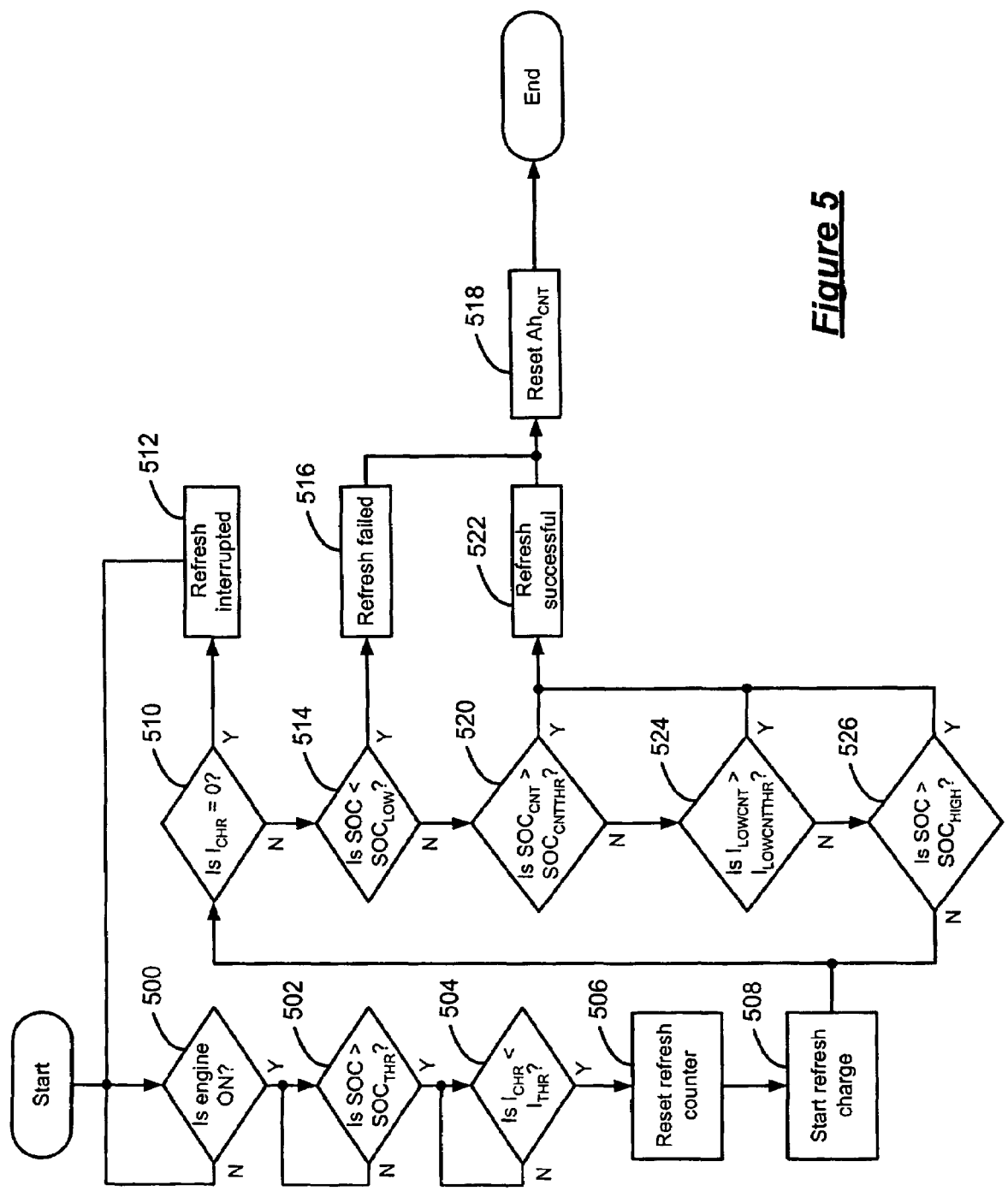
FIG. 5 is a flowchart illustrating steps executed by the refresh control system during the battery refresh charge.

Referring now to FIG. 5, the steps executed by the refresh control system during the refresh charge will be described in detail. In step 500, control determines whether the engine is ON. If the engine is ON, control continues in step 502. If the engine is not ON, control loops back. In step 502, control determines whether the SOC is greater than an SOC threshold ($SOC_{THR}$). If the SOC is greater than $SOC_{THR}$, control continues in step 504. If the SOC is not greater than $SOC_{THR}$, control loops back. In step 504, control determines whether a charging current ($I_{CHR}$) is less than a current threshold ($I_{THR}$). If $I_{CHR}$ is not less than $I_{THR}$, control loops back. If $I_{CHR}$ is less than $I_{THR}$, control resets a refresh counter in step 506. In step 508, control starts the refresh charge.

In step 510, control determines whether $I_{CHR}$ is equal to zero. If $I_{CHR}$ is equal to zero, control indicates that the refresh has been interrupted in step 512 and loops back to step 500. In the event that the refresh is interrupted, the refresh counter is stored in memory, whereby when the refresh is re-started, the counter already accounts for the refresh time prior to interruption. If $I_{CHR}$ is not equal to zero, control determines whether SOC is less than a low SOC limit ($SOC_{LOW}$) in step 514. If the SOC is less than $SOC_{LOW}$, control indicates that the refresh failed in step 516 and continues in step 518. If the SOC is not less than $SOC_{LOW}$, control determines whether an SOC counter ($SOC_{CNT}$) is greater than an SOC counter threshold ($SOC_{CNTTHR}$) in step 520. If $SOC_{CNT}$ is greater than $SOC_{CNTTHR}$, control indicates that the refresh was successful in step 522 and continues in step 518. In step 518, control resets $Ah_{CNT}$ and control ends. If $SOC_{CNT}$ is not greater than $SOC_{CNTTHR}$, control continues in step 524.

In step 524, control determines whether a low current counter ($I_{LOWCNT}$) is greater than a low current counter threshold ($I_{LOWCNTTHR}$). If $I_{LOWCNT}$ is greater than $I_{LOWCNTTHR}$, control continues in step 522. If $I_{LOWCNT}$ is not greater than $I_{LOWCNTTHR}$, control continues in step 526. In step 526, control determines whether the SOC is greater than a high limit ($SOC_{HIGH}$). If SOC is greater than $SOC_{HIGH}$, control continues in step 522. If SOC is not greater than $SOC_{HIGH}$, control loops back to step 510.

Figure 6:
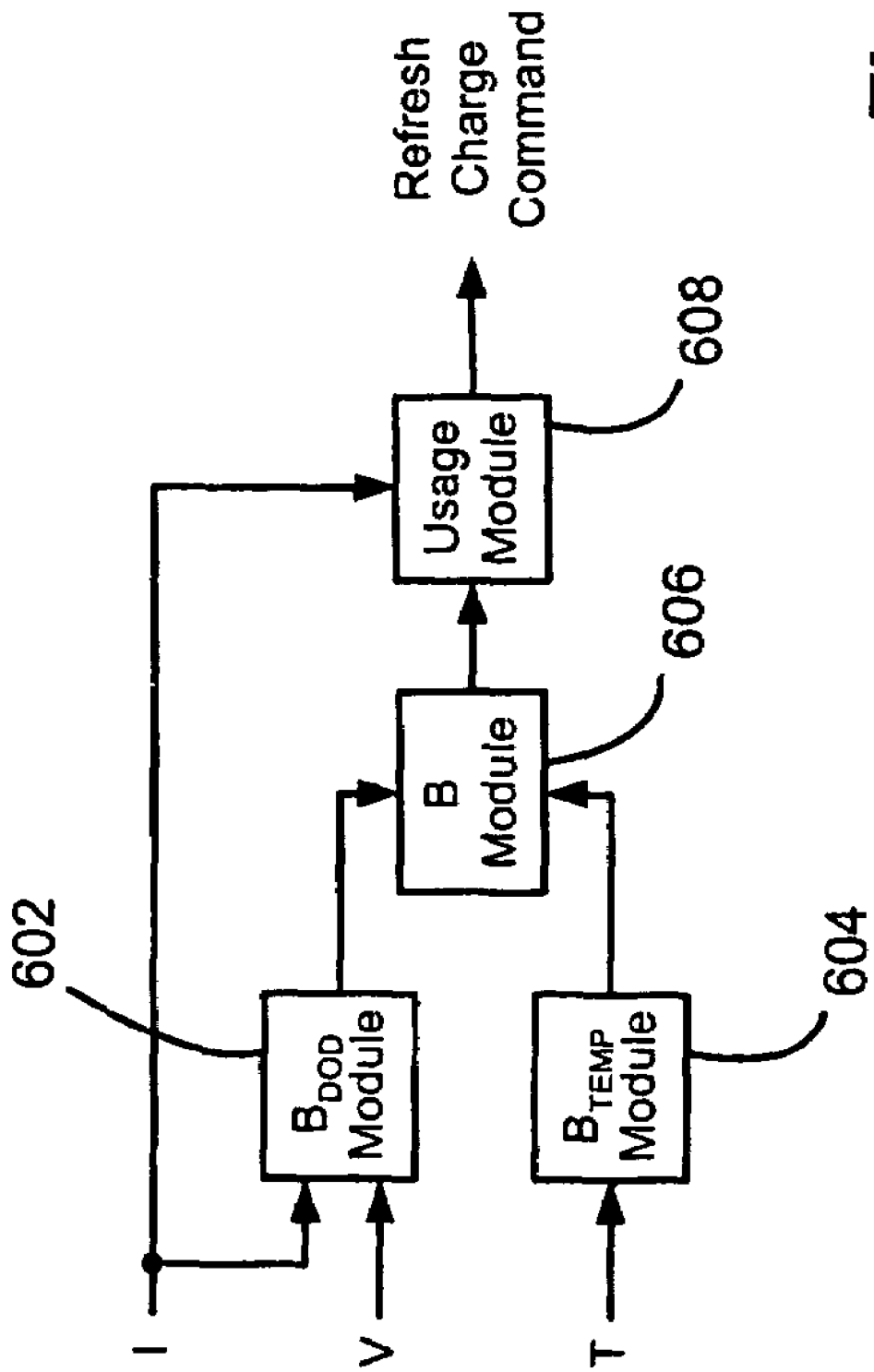
FIG. 6 is a functional block diagram of modules of the battery refresh control system.

Referring now to FIG. 6, the battery control system can include a $B_{DOD}$ module 602, a $B_{TEMP}$ module 604, a B module 606 and a usage module 608. The $B_{DOD}$ module 602 determines $B_{DOD}$ based on the battery voltage (V) and the battery current (I), as explained in detail above. The $B_{TEMP}$ module 604 determines $B_{TEMP}$ based on the battery temperature (T), as explained in detail above. The B module 606 calculates B based on $B_{DOD}$ and $B_{TEMP}$, as explained in detail above. The usage module 608 selectively generates a refresh charge command based on I and B. More specifically, the usage module 608 monitors $Ah_{CNT}$ based on I and determines $Ah_{MOD}$ based on B. The usage module 608 generates the refresh charge command if $Ah_{CNT}$ exceeds $Ah_{MOD}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A refresh control system to selectively initiate a refresh charge cycle of an energy storage device, comprising:
    a bias factor module that determines a bias factor; and
    a usage period module that monitors a usage period of said energy storage device, that determines a modified usage period threshold based on a usage period threshold and said bias factor and that initiates said refresh charge cycle of said energy storage device when said usage period exceeds said modified usage period threshold.

2. The refresh control system of claim 1 further comprising a depth of discharge (DOD) bias factor module that determines a DOD bias factor, wherein said bias factor is determined based on said DOD bias factor.

3. The refresh control system of claim 2 wherein said DOD bias factor is determined based on a current of said energy storage device.

4. The refresh control system of claim 2 wherein said DOD bias factor is determined based on a voltage of said energy storage device.

5. The refresh control system of claim 1 further comprising a temperature bias factor module that determines a temperature bias factor, wherein said bias factor is determined based on said temperature bias factor.

6. The refresh control system of claim 5 wherein said temperature bias factor is determined from a look-up table based on said temperature.

7. The refresh control system of claim 6 wherein said temperature is an average temperature that is determined over said usage period.

8. The refresh control system of claim 1 wherein said usage module monitors a rest time of said energy storage device and initiates said refresh charge cycle when said rest time exceeds a threshold rest time.

9. A refresh control system to selectively initiate a refresh charge cycle, comprising:
an energy storage device;
an electric machine that is operable to charge said energy storage device; and
a control module that monitors a usage period of said energy storage device, that determines a bias factor, that determines a modified usage threshold based on a usage threshold and said bias factor and that regulates said electric machine to initiate a refresh charge cycle of said energy storage device when a usage period exceeds said modified usage threshold.

10. The refresh control system of claim 9 wherein said bias factor includes a temperature bias factor.

11. The refresh control system of claim 10 further comprising a temperature sensor that monitors a temperature of said energy storage device, wherein said temperature bias factor is determined based on said temperature.

12. The refresh control system of claim 11 wherein said temperature bias factor is determined from a look-up table based on said temperature.

13. The refresh control system of claim 11 wherein said temperature is an average temperature that is determined over said usage period.

14. The refresh control system of claim 9 wherein said bias factor includes a depth of discharge (DOD) bias factor.

15. The refresh control system of claim 14 further comprising a current sensor that monitors a current of said energy storage device, wherein said DOD bias factor is determined based on said current.

16. The refresh control system of claim 14 further comprising a voltage sensor that monitors a voltage of said energy storage device, wherein said DOD bias factor is determined based on said voltage.

17. The refresh control system of claim 9 wherein said control module monitors a rest time of said energy storage device and regulates said electric machine to initiate a refresh charge cycle of said energy storage device when said rest time exceeds a threshold rest time.

18. The refresh control system of claim 9 wherein said control module regulates said electric machine to initiate a refresh charge cycle of said energy storage device when said usage period exceeds said modified usage threshold, a state of charge (SOC) of said energy storage device is above an SOC threshold and a current of said energy storage device is below a current threshold.

19. The refresh control system of claim 9 further comprising an engine that selectively drives said electric machine, wherein said control module regulates said electric machine to initiate a refresh charge cycle of said energy storage device when said usage period exceeds said modified usage threshold and said engine is on.

20. The refresh control system of claim 9 wherein said usage period includes an amp-hour count and said modified usage threshold includes a modified amp-hour count.

21. A method of initiating a refresh charge cycle of an energy storage device, comprising:
monitoring a usage period of said energy storage device;
determining a bias factor;
determining a modified usage threshold based on a usage threshold and said bias factor; and
regulating said electric machine to initiate a refresh charge cycle of said energy storage device when said usage period exceeds said modified usage threshold.

22. The method of claim 21 wherein said bias factor includes a temperature bias factor.

23. The method of claim 22 further comprising monitoring a temperature of said energy storage device, wherein said temperature bias factor is determined based on said temperature.

24. The method of claim 23 further comprising determining said temperature bias factor from a look-up table based on said temperature.

25. The method of claim 23 wherein said temperature is an average temperature that is determined over said usage period.

26. The method of claim 21 wherein said bias factor includes a depth of discharge (DOD) bias factor.

27. The method of claim 26 further comprising monitoring a current of said energy storage device, wherein said DOD bias factor is determined based on said current.

28. The method of claim 26 further comprising monitoring a voltage of said energy storage device, wherein said DOD bias factor is determined based on said voltage.

29. The method of claim 21 further comprising monitoring a rest time of said energy storage device and regulating said electric machine to initiate a refresh charge cycle of said energy storage device when said rest time exceeds a threshold rest time.

30. The method of claim 21 further comprising regulating said electric machine to initiate a refresh charge cycle of said energy storage device when said usage period exceeds said modified usage threshold, a state of charge (SOC) of said energy storage device is above an SOC threshold and a current of said energy storage device is below a current threshold.

31. The method of claim 21 further comprising regulating said electric machine to initiate a refresh charge cycle of said energy storage device when said usage period exceeds said modified usage threshold and when an engine that drives said electric machine is on.

32. The method of claim 21 wherein said usage period includes an amp-hour count and said modified usage threshold includes a modified amp-hour count.

33. A method of initiating a refresh charge cycle of an energy storage device, comprising:
monitoring an amp-hour count of said energy storage device;
determining a total bias factor based on a plurality of bias factors;
determining a modified amp-hour threshold based on an amp-hour threshold and said total bias factor; and
regulating said electric machine to initiate a refresh charge cycle of said energy storage device when an amp-hour count exceeds said modified amp-hour threshold.

34. The method of claim 33 wherein said plurality of bias factors include a temperature bias factor.

35. The method of claim 34 further comprising monitoring a temperature of said energy storage device, wherein said temperature bias factor is determined based on said temperature.

36. The method of claim 35 further comprising determining said temperature bias factor from a look-up table based on said temperature.

37. The method of claim 35 wherein said temperature is an average temperature that is determined over said usage period.

38. The method of claim 33 wherein said plurality of bias factors include a depth of discharge (DOD) bias factor.

39. The method of claim 38 further comprising monitoring a current of said energy storage device, wherein said DOD bias factor is determined based on said current.

40. The method of claim 38 further comprising monitoring a voltage of said energy storage device, wherein said DOD bias factor is determined based on said voltage.

41. The method of claim 33 further comprising monitoring a rest time of said energy storage device and regulating said electric machine to initiate a refresh charge cycle of said energy storage device when said rest time exceeds a threshold rest time.

42. The method of claim 33 further comprising regulating said electric machine to initiate a refresh charge cycle of said energy storage device when said amp-hour count exceeds said amp-hour threshold, a state of charge (SOC) of said energy storage device is above an SOC threshold and a current of said energy storage device is below a current threshold.

43. The method of claim 33 further comprising regulating said electric machine to initiate a refresh charge cycle of said energy storage device when said amp-hour count exceeds said amp-hour threshold and when an engine that drives said electric machine is on.

44. A refresh control system to selectively initiate a refresh charge cycle, comprising:
an engine;
an electric machine that is selectively driven by said engine;
an energy storage device that is charged based on energy generated by said electric machine; and
a control module that monitors an amp-hour count of said energy storage device, that determines a total bias factor based on a plurality of bias factors, that determines a modified amp-hour threshold based on an amp-hour threshold and said plurality of bias factors and that regulates said electric machine to initiate a refresh charge cycle of said energy storage device when an amp-hour count exceeds said modified amp-hour threshold.

45. The refresh control system of claim 44 wherein said plurality of bias factors include a temperature bias factor.

46. The refresh control system of claim 44 further comprising a temperature sensor that monitors a temperature of said energy storage device, wherein said temperature bias factor is determined based on said temperature.

47. The refresh control system of claim 46 wherein said temperature bias factor is determined from a look-up table based on said temperature.

48. The refresh control system of claim 46 wherein said temperature is an average temperature that is determined over said usage period.

49. The refresh control system of claim 46 wherein said plurality of bias factors include a depth of discharge (DOD) bias factor.

50. The refresh control system of claim 49 further comprising a current sensor that monitors a current of said energy storage device, wherein said DOD bias factor is determined based on said current.

51. The refresh control system of claim 49 further comprising a voltage sensor that monitors a voltage of said energy storage device, wherein said DOD bias factor is determined based on said voltage.

52. The refresh control system of claim 46 wherein said control module monitors a rest time of said energy storage device and regulates said electric machine to initiate a refresh charge cycle of said energy storage device when said rest time exceeds a threshold rest time.

53. The refresh control system of claim 44 wherein said control module regulates said electric machine to initiate a refresh charge cycle of said energy storage device when said amp-hour count exceeds said modified amp-hour threshold, a state of charge (SOC) of said energy storage device is above an SOC threshold and a current of said energy storage device is below a current threshold.

54. The refresh control system of claim 44 further comprising an engine that selectively drives said electric machine, wherein said control module regulates said electric machine to initiate a refresh charge cycle of said energy storage device when said amp-hour count exceeds said modified amp-hour threshold and said engine is on.

\* \* \* \* \*